United States Patent [19]
Riethmeier et al.

[11] 3,735,043
[45] May 22, 1973

[54] DATA TRANSMISSION SYSTEM INTERRUPTION MONITOR

[75] Inventors: Alton F. Riethmeier, Rochester; Frank R. Fahey, Pittsford, both of N.Y.

[73] Assignee: Xerox Corporation, Rochester, N.Y.

[22] Filed: Nov. 14, 1968

[21] Appl. No.: 776,860

[52] U.S. Cl. ..............................178/69 G, 340/253 R
[51] Int. Cl. ..............................H04l 25/02
[58] Field of Search ..................178/69 G; 340/253, 340/309.4, 326, 327; 46/227, 228

[56] References Cited

UNITED STATES PATENTS

| | | | |
|---|---|---|---|
| 3,127,599 | 3/1964 | Smith et al. | 340/309 |
| 3,317,668 | 5/1967 | Johnsen | 178/69 |
| 3,331,921 | 7/1967 | Neiswinter et al. | 178/69 |
| 3,358,277 | 12/1967 | Selig | 340/309 |

*Primary Examiner*—Ralph D. Blakeslee
*Assistant Examiner*—Douglas W. Olms
*Attorney*—James J. Ralabate, John E. Beck and Franklyn C. Weiss

[57] ABSTRACT

An end of transmission signal apparatus for indicating that a facsimile system or other data communication apparatus has ceased transmitting or receiving a message. By the means of logic and timing circuits, an audible and/or visual indication is provided upon detection of a completion of a message or that the data transmission system has ceased operating for any one of various reasons. The visual indication is a light which flashes alternately with the sounding of a buzzer.

4 Claims, 2 Drawing Figures

INVENTORS.
FRANK R. FAHEY
ALTON F. RIETHMEIER
BY Franklyn C. Weiss
ATTORNEY

DATA TRANSMISSION SYSTEM INTERRUPTION MONITOR

BACKGROUND OF THE INVENTION

In prior art facsimile systems, documents to be transmitted are scanned at a transmitting station to convert information on the document into a series of electrical signals. These video signals are then coupled to the input of a communication link interconnecting a transmitter with a receiver. At a receiving location, video signals selectively control the actuation of appropriate marking means to generate a facsimile of the document transmitted.

Many facsimile systems, whether they be discrete transmitting and receiving units or transceivers, are used in data or communication centers where other information transmission systems may be in use. Such units may include Teletype systems, computer output devices, other facsimile systems, etc. The background noise level in a room with systems as hereinabove set forth may be such that the operation status of a particular system may be difficult to monitor by an operator who has other duties to perform within the data or communication center. Thus, when a document, for example, is transmitted or received over a facsimile communication system, the operator may not know that the transmission has ended or been interrupted due to such background noise level in the area.

In any data communication system the communication link between a transmitting unit and a receiving unit is a relatively large portion of the total cost of the system. Whether it be common carrier telephone lines, microwave communications links, leased line telephone systems, or whatever, it is important from a cost aspect that the end of a message or other interruption of a facsimile or other type of system be known in order that corrective or other measures be taken immediately. Further, if such a data communication system is located in an area removed from the normal location of the operator of the system, time may be wasted by such operator in the continual monitoring of the data system for breakdowns or other interruptions in the system. It is important, therefore, for an operator to be apprised of the cessation of operation of a data communication system, such as a facsimile system, in order to maintain the system on-line the maximum period of time and also to monitor breakdowns or other interruptions in said systems.

OBJECTS OF THE INVENTION

It is, accordingly, an object of the present invention to optimize the operation of a data communication system.

It is another object of the present invention to monitor the operation of a data communication system.

It is another object of the present invention to provide a sensory indication of the interruption in operation of a data communication system.

It is another object of the present invention to provide an audible or visual indication of the interruption in operation of a data communication system.

It is another object of the present invention to provide a visual and/or audible indication of the interruption or end of transmission in a facsimile communication system.

BRIEF SUMMARY OF THE INVENTION

In accomplishing the above and other desired aspects of the present invention, Applicants have invented novel apparatus for monitoring the operation of a data communication system such as a facsimile transmission system. By various inputs denoting certain conditions noted below, logic circuitry in conjunction with a timing circuit initiates the operation of a buzzer and/or lamp. Two signal inputs are present in the circuitry of the present invention. One signal is a status level signal which originates in the facsimile system and controls the operation of the end of transmission signal circuitry. This status level signal exists when the facsimile unit is in operation. If the facsimile unit ceases operation for any condition, the timing circuit is activated and the buzzer and lamp combination is in turn activated. The facsimile unit may, for example, cease operation due to the detection of the end of a message and may further include unintentional interruptions such as loss of the carrier signal, a jam of the document drive in the facsimile unit, an indication of a malfunction in the connection from the facsimile unit to the transmission link, a lack of input documents or record paper, and any other condition which causes the interruption in operation of the facsimile unit. The other input to the circuitry of the present invention is the accessory interlock switch input which operates when, for example, the access door to the facsimile unit is opened. The opening of the door switches off the lamp and buzzer combination as, for example, when the operator returns to the unit upon noting the operation of the buzzer and/or lamp.

At the end of message signal circuit apparatus itself are a manual reset input and an audio on-off switch input. The manual reset signal is another method of switching off the lamp and buzzer combination by the operator at the location of the end of message signal circuitry. The audio on-off switch inactivates the buzzer in the event that an operator desires only that the presence of the flashing lamp to indicate the interruption in operation of the facsimile unit.

DESCRIPTION OF THE DRAWINGS

For a more complete understanding of the invention, as well as other objects and further features thereof, reference may be had to the following detailed description in conjunction with the drawings wherein.

DETAILED DESCRIPTION OF THE INVENTION

Figure 1:
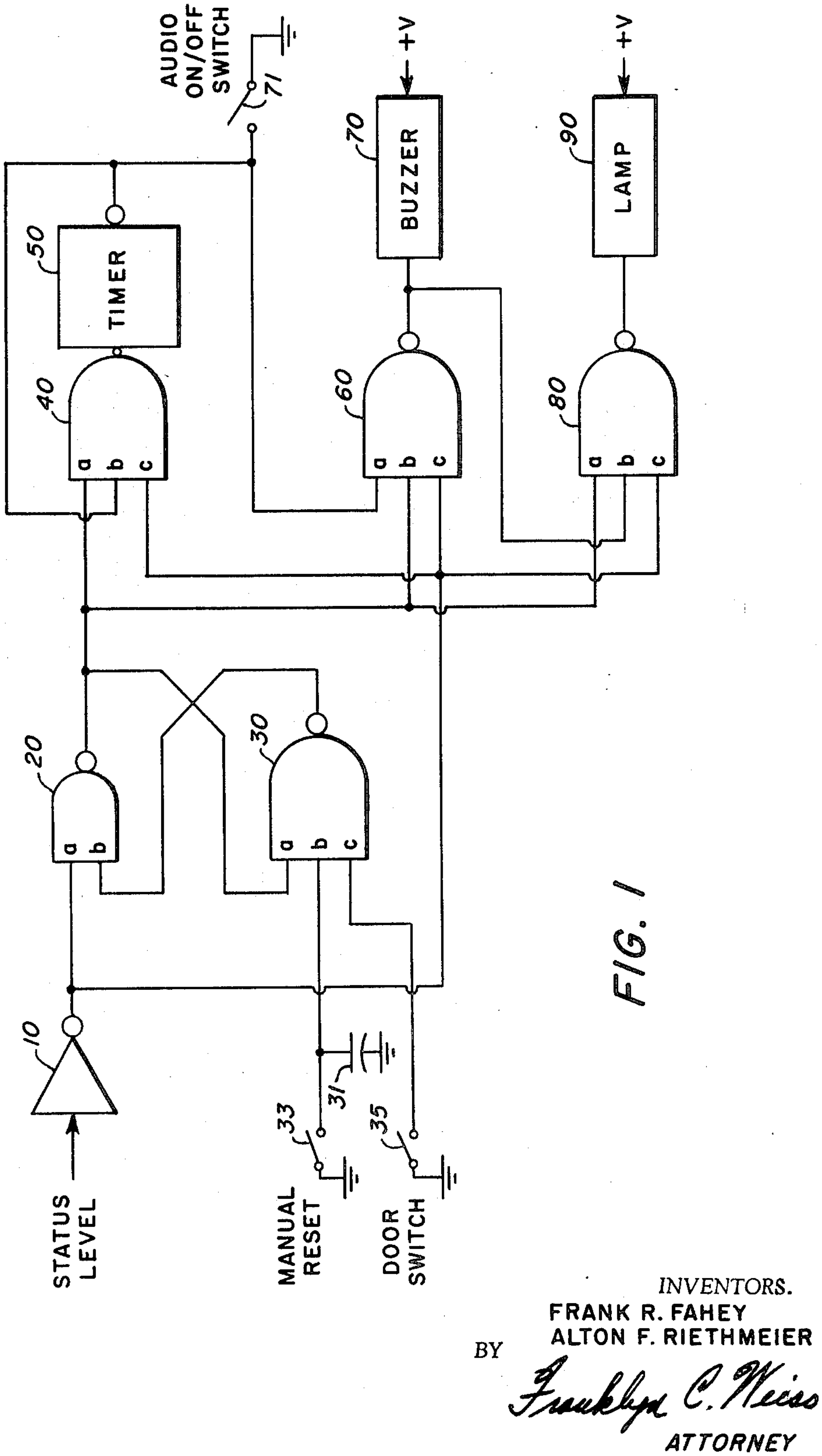
FIG. 1 is a block diagram of the electrical and logic circuitry included in the end of message signal apparatus employing the principles of the present invention.

FIG. 1 of the present application shows a block diagram of the logic circuitry which in conjunction with the timer operates the buzzer and lamp in the end of message signal circuit. The external signal inputs to the circuit are the status level signal which is the general signal input to the circuit indicating the status of operation of the data communication system, which in this specification is being denoted as a facsimile system. As indicated previously, the status signal input indicates that a complete message has been received by the facsimile unit, but, in addition, may indicate that the machine may have jammed for some mechanical interruption, the paper supply to the facsimile unit has run low, etc. The other signal input from the facsimile unit is the door switch signal which inactivates the buzzer and lamp from operating when the door is opened to the facsimile unit by an operator to remove a completed document and/or reinsert another copy sheet or original document.

The end of message signal circuit apparatus contains two operating controls at the apparatus itself. The manual reset switch controls the operation of the timing circuit to cease the operation of the buzzer and lamp when the operator notes the operation of said buzzer and lamp, indicating either a fault in the system or the end of a message being received. The manual reset switch operates in the same manner as the door switch to disable the end of message signal circuitry from energizing the buzzer or lamp. The other control at the end of message signal circuit apparatus is the audio on-off switch that is utilized to disable the buzzer from sounding by an operator who desires to simply monitor the flashing of the lamp.

The status level signal is received at inverter 10, the output of which is coupled to the inputs of NAND gates 20, 40, 60 and 80. The output of NAND gate 20 is coupled to the input of NAND gate 30, NAND gates 20 and 30 operating as a conventional latch circuit. The output of NAND gate 20 is also coupled to the inputs of NAND gates 40, 60 and 80. The other two inputs to NAND gate 30 are the manual reset signal and the door switch signal. The output of NAND gate 40 is coupled to the timer circuit 50, the output of which is coupled to the other input of NAND gate 60 and the audio on-off switch 71. The output of NAND gate 60 is coupled to buzzer 70 and the other input to NAND gate 80. Lamp 90 is coupled to the output of NAND gate 80.

The signal level on the status level signal input to inverter 10 is at a negative voltage when the facsimile unit is operating. When an interruption or end of message signal is received, the signal level on this input line goes to ground. If a minus voltage level is defined as logic one and ground is defined as logic zero, when the facsimile unit is operating normally, the signal level on the status input line is a logic one. By inversion in the inverter 10, the output is at a logic zero when the input is at logic one. It is, therefore, only the status level which operates with negative logic, the remainder of the circuit operates with positive logic. This logic zero condition is coupled to input 20*a* of NAND gate 20, and the inputs C to NAND gates 40, 60 and 80. With the c inputs of NAND gates 60 and 80 being at the logic zero level when the facsimile unit is operating normally, the output of NAND gates 60 and 80 will be at a logic one. This is due to the fact that the truth table for a NAND gate defines the output at logic one when any input to the NAND gate is at logic zero. Inasmuch as the buzzer 70 and the lamp 90 are connected externally to a positive power source, a ground input is necessary to complete the circuit for operation of the buzzer 70 and lamp 90. As ground is defined as logic zero, the presence of logic one on the outputs of NAND gates 60 and 80 effectively inactivate the buzzer and lamp. This is as it should be because when the facsimile unit is operating normally the buzzer 70 and lamp 90 should not operate.

In normal operation switches 33 and 35 are open causing logic one levels to appear at inputs 30*b* and 30*c* of NAND gate 30. Capacitor 31 is utilized to eliminate switch noise on terminal 30b. With the signal level on terminal 30a of NAND gate 30 being at a logic one due to the logic one level appearing on the output of NAND gate 20, the output of NAND gate 30 is a logic zero because of the logic one level on inputs 30b and 30*c*, according to the truth table of a NAND gate. Thus, the input 20b of NAND gate 20 has a logic zero level appearing on it during the period when the facsimile unit is operating normally. When,, an interruption or end of message signal indication appears at the facsimile unit the logic level on the status input line to inverter 10 goes from logic one to logic zero in accordance with the definition set forth earlier. The output of inverter 10 goes from logic zero to logic one. This condition appearing at the input 20a of NAND gate 20 does not change the status of the output of the NAND gate 20 because of the logic zero input at 20*b*, and it remains at logic one. Thus,, the inputs 40*a*, 60*b*, and 80*a* will remain at the logic one level. However, the output of inverter 10 is also coupled to NAND gates 40, 60, and 80 at terminals *c*. As the operation of timer 50 is defined at a high or logic one level until energized, the inputs to NAND gate 40 are now logic one on 40*a*, logic one on 40*b*, and terminal 40*c* going from logic zero to logic one at the interruption or end of message. With all three inputs to NAND gate 40 appearing at logic one, the timer 50 begins the timing operation in accordance with internal resistances and capacitances to determine the time constant thereof.

With input 60a of NAND gate 60 being at a logic one level as coupled to the output of timer 50, with input 60*b* remaining at the logic one level as coupled to the output of NAND gate 20, and with input 60*c* going from logic zero to logic one as coupled to the output of inverter 10, all the inputs to the NAND gate 60 are now at a logic one. With all inputs to the NAND gate appearing at logic one, by the truth table for a NAND gate, the output thereof goes from logic one, which it had been previously, to logic zero. As hereinbefore set forth, the buzzer 70 is activated when a logic zero i.e. ground appears at its input. Thus, when the interruption or end of message indication signal is received at the end of message signal circuit, the buzzer begins to sound as long as on-off switch 71 is open. While the buzzer is sounding, the inputs to NAND gate 80 are a logic one at terminal 80*a* by coupling to the output of NAND gate 20, terminal 80*b* goes from logic one to logic zero upon the initial sounding of buzzer 70, while terminal 80*c* of NAND gate 80 goes from logic zero to logic one as coupled to the output of inverter 10. Thus, with the input to terminal 80*b* being at a logic zero, the output of the NAND gate remains at a logic one, thereby continually inactivating lamp 90.

When the timer 50 has timed out according to the time constant therein, the output of the timer 50 is defined as going from logic one to logic zero. This output is coupled to terminal 40*b* and to terminal 60*a*. With logic zero appearing at terminal 40*b* the output of the NAND gate 40 is now at a logic one which initiates another timing sequence with a different time constant in the timer 50 at the logic zero level. Since the output of timer 50 is at logic zero level, input 60*a* is also at the logic zero level. With the input 60*a* being at a logic zero, the output from NAND gate 60 returns to the logic one level, thereby de-energizing the buzzer 70. Now, however, the input 80b returns to the logic one level, thereby causing all the inputs to NAND gate 80 to be at a logic one level, the output therefrom goes from logic one to logic zero, energizing the lamp.

After the timer has finished the timing sequences for the duration period of the lamp 90, the output from the timer 50 returns to logic one from the logic zero, thereby de-energizing the lamp and energizing the buzzer 70. This sequence of the buzzer and lamp operating alternatively continues until the manual reset switch is activated or the door to the facsimile unit is opened. As hereinbefore set forth, if the audio on-off switch is depressed at any time, a ground or logic zero appears at terminal 60*a* which forces a logic one to appear at the output of NAND gate 60, thereby continually de-energizing buzzer 70.

After an interruption had occurred at the facsimile unit, as was set forth above, a logic one appears at the input 20*a* of NAND gate 20. When, however, either or both of the manual reset 33 or door 35 switches are energized, a ground or logic zero level appears at inputs 30*b* or 30*c* of NAND gate 30. When such a logic zero appears at the input of a NAND gate the output therefrom automatically goes to logic 1 which now appears at input 20*b*. With both inputs of NAND gate 20 now appearing at logic one, the output therefrom goes to logic zero which causes logic ones to appear at the output of NAND gates 60 and 80, thereby de-energizing both the buzzer and lamp.

Figure 2:
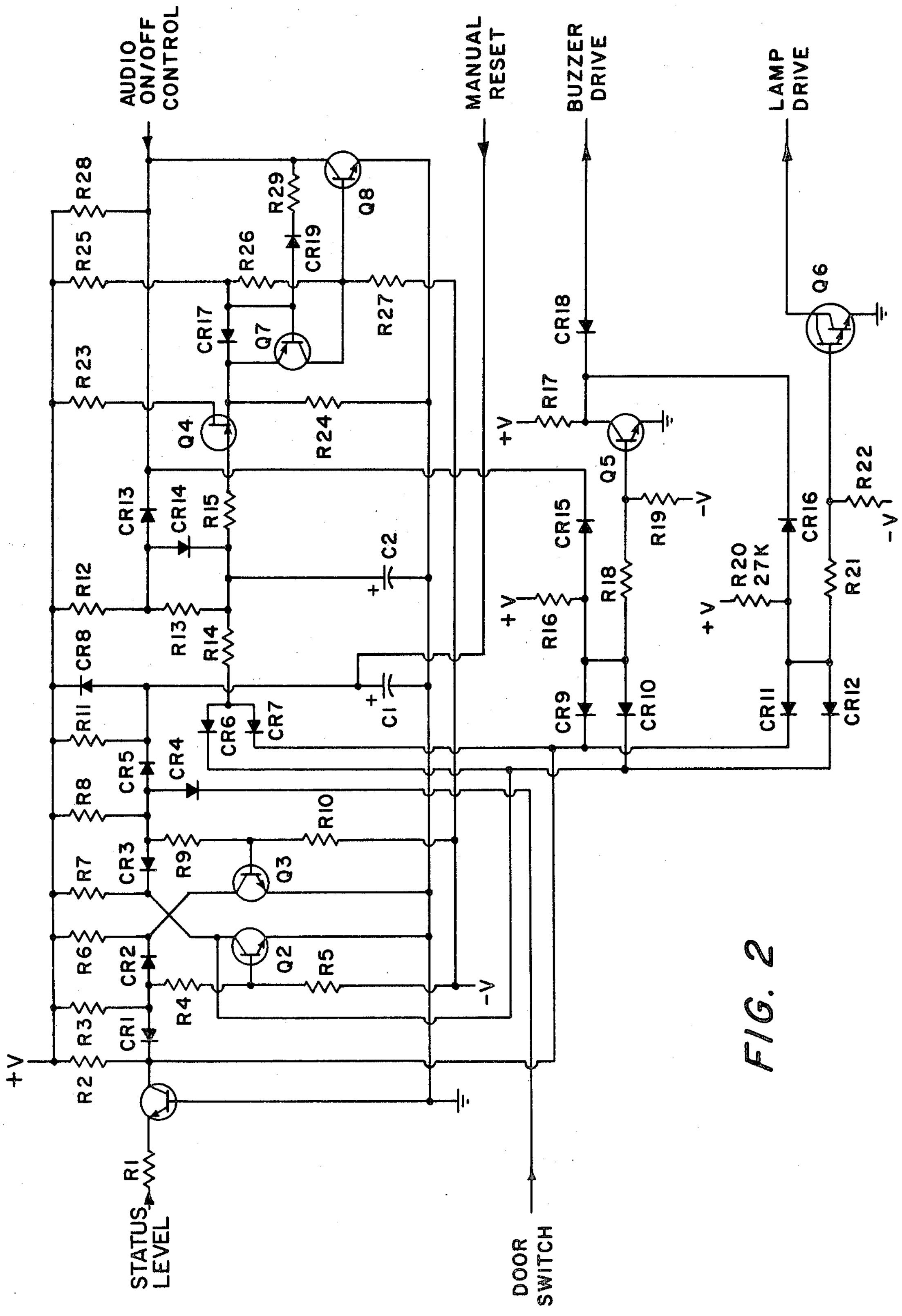
FIG. 2 is a schematic diagram of the logic and electrical circuitry seen in FIG. 1.

Referring now to FIG. 2, there is shown therein the schematic diagram of the circuitry set forth in FIG. 1. The signal denoting an interruption or end of message indication, appears on the status level line through resistor R1 and inverted by transistor Q1. As seen in FIG. 1, the output of transistor Q1 appears on inputs 20*a*, 40*c*, 60*c* and 80*c*, to the various NAND gates as seen in FIG. 2. For ease of illustration it can be seen that similar components or inputs are labelled similarly with that shown in FIG. 1. NAND gate 20 can be seen to comprise transistor Q2 and associated components, resistors R3, R4, R5, R6, and diodes CR1 and CR2. Resistor R2 is coupled to a common input line to a positive voltage supply which supplies operating potential to transistor Q1. The output from NAND gate 20, which appears on the line indicated 20b is the input the NAND gate 30 which comprises transistor Q3 and associated components, resistors R7, R8, R9, R10, R11, and diodes CR3, CR4, and CR5. The inputs to NAND gate 20 which are similar to that seen in FIG. 1 are the lines marked 20*a* from transistor Q1, and the line marked 20*b* coupled to the collector of transistor Q3. The inputs to NAND gate 30 are input 30*a* which is coupled to the output of NAND gate 20, that is the collector of transistor Q2; while input 30*b* is coupled to the manual reset switch 33, and input 30*c* is coupled to door switch 35. Capacitor C1, which is capacitor 31 seen in FIG. 1, is connected between the manual reset input line and ground. The charging circuit for this capacitor is R11 which is used to slowly charge capacitor C1 to the operating potential +V which thereby determines a specific logic level input on line 30*b* to the NAND gate 30. As hereinbefore set forth, when the system is originally energized as when a document is to be transmitted or received, in order to specifically determine the inputs to the specific AND gate, capacitor C1 is utilized to maintain a ground potential or input 30*b* of NAND gate 30 which maintains the output of NAND gate 30 at the logic one level. This initial logic one level can be seen to be necessary in the operation thereof set forth above for FIG. 1.

The inputs to NAND gate 40 includes input 40*a* which is coupled to diode CR6. Input 40*b* is the feedback loop to diode CR13 from the timing circuit. Input 40*c* is the input from the output of inverter 10 and appears at diode CR7. The time constants of the circuit are determined by resistors R12 and R13 which determine the amount of current passing to capacitor C2. When the buzzer is operating, the charging path is from the positive supply voltage +V through the resistor R12 and diode CR14 to capacitor C2. When the lamp is operating, the charging path is through the resistor R12 and R13, with the diodes CR13 and CR14 back biased. When the capacitor C2 is charging to its predetermined voltage, as determined by the RC time constant thereof, field effect transistor Q4, through the resistors R15, R23 and R24 coupled thereto, generates the necessary voltage for the operation of timing transistors Q7 and Q8. When the inputs to the timing circuit are such that the buzzer and lamp are inactivated, the output of field effect transistor Q4, which is coupled to resistor R24, is effectively at ground potential. At this time transistor Q7 and thus transistor Q8 are both turned off, thereby allowing the supply voltage +V to appear at the collector of transistor Q8 through resistor R28. When capacitor C2 has charged up to its predetermined voltage, upon the necessary inputs to NAND gate 40, the field effect transistor Q4 passes current through R23, the transistor Q4, and through resistor R24 to ground. At this point, therefore, a positive voltage appears at the output of field effect transistor Q4 at the junction with R24. This applies a positive voltage to the input emitter of transistor Q7, allowing current to pass through resistor R25, diode CR17, through the transistor Q7 and resistor R27 back to the negative voltage supply −V. The positive voltage now appearing at the base of transistor Q8 forward biases this transistor, turning it on, effectively placing the collector thereof at ground potential. Thus, the operating points of transistor Q8 are the supply voltage +V and ground. This output from the collector of transistor Q8 is coupled to the input 40*b* of NAND gate 40 for the necessary logic operations as set forth in FIG. 1.

When the operator desires that the buzzer be inactivated and only the lamp to flash, the audio on-off switch 71 may be closed placing a ground potential on the feedback loop line no matter what happens to the field effect transistor and associated resistors Q7 and Q8. The logic level, therefore, on input 40*b* is a logic zero which places input 60*a* at logic zero, which by the truth table of a NAND gate, places a logic one at the output thereof, thereby deenergizing the buzzer 70 as described in conjunction with FIG. 1.

NAND gate 60 comprises transistor Q5 and associated components, resistors R16, R17, R18 and R19. Input 60*a* is coupled to diode CR15, input 60*b* is coupled to diode CR10, and input 60*c* is coupled to diode CR9. In order for the buzzer to operate, a ground potential is necessary for its operation. Thus, a logic one level must appear at each of the inputs 60*a*, 60*b* and 60*c*. When these inputs are present, the diodes are back biased, allowing current to flow from the positive voltage supply +V through resistors R16, R18, and R19 back to the negative voltage supply −V. The transistor Q5 is now forward biased allowing current to flow from the positive voltage supply +V to R17 and the transistor Q5. When current flows in this manner, the collector of transistor Q5 is effectively at ground potential, allowing the buzzer to operate through its remote positive potential through diode CR18 and transistor Q5. Diode CR18 is utilized to eliminate feedback from the buzzer which may falsely cause internal operations in the circuit.

NAND gate 80 comprises transistor Q6 and associated components, resistors R20, R21, and R22, and diodes CR11, CR12, and CR16. The inputs to NAND gate 80 are input 80*a* coupled to diode CR12, input 80*b* coupled to diode CR16, and input 80*c* coupled to diode CR11. In a similar manner as that for NAND gate 60, when all three inputs are at logic one, current flows from the positive voltage supply +V through resistors R20, R21, and R22 to the negative voltage supply −V. Transistor Q6 is now forward biased to allow the positive voltage supply to supply current to the lamp to ground through transistor Q6. As shown in FIG. 2, transistor Q6 comprises a Darlington circuit which allows for increased current flow necessitated by the heavy load through the lamp.

In the foregoing there has been disclosed apparatus for indicating to an operator that the end of message or an interruption has occurred in a facsimile communication system. A facsimile system has been shown and described; however, it is apparent that any data transmission system may be utilized in conjunction with the present invention.

A light and buzzer have been shown and described, but it is also apparent that other types of indicator or monitoring devices may be effectively utilized without deviating from the principles of the present invention.

Moreover, while the invention has been described with reference to specific components and logic circuitry, it will be understood by those skilled in the art that various changes may be made and equivalents may be substituted for elements thereof without departing from the true spirit and scope of the invention. In addition, many modifications may be made to adapt a particular situation to the teaching of the invention without departing from its essential teachings.

What is claimed is:

1. Apparatus for indicating the interruption in operation of a data transmission system comprising:

means for monitoring the status of operation of said data transmission system, said monitoring means comprising first circuit means for detecting the status level of the input from said data transmission system, and timing circuit means coupled to said first circuit means for initiating a timing sequence upon an indication of an interruption at said first circuit means, means coupled to said monitoring means for generating a sensory indication that the operation of said data transmission system has been interrupted, second circuit means coupled to said first circuit means and said timing circuit means for selectively controlling the operation of said sensory indication generating means, and switch means coupled to the input of said first circuit means for resetting said monitoring means for continuous monitoring of the operation of said data transmission system, said sensory indication generating means comprising means for providing an audible sensory indication, and means for providing a visual sensory indication, said second circuit means controlling the sequence of operation of said audible indication means and said visual indication means.

2. The apparatus as set forth in claim 1 wherein said switch means comprises a first switch for manually resetting said monitoring means, and a second switch coupled to an accessory interlock means for the resetting of said monitoring means upon operation of said accessory interlock means.

3. The apparatus as set forth in claim 2 wherein said first circuit means comprises logical latch circuit means for remaining in a first binary state after monitoring the interruption of operation of said data transmission means until the operation of said first or second switch means.

4. The apparatus as set forth in claim 3 wherein said second circuit means comprises NAND gate logical means for preventing the operation of said visual and audible sensory indication means until the receipt of a signal indicating the interruption in operation of said data transmission system and a timing signal from said timing circuit means.

* * * * *